United States Patent
Haartsen et al.

(10) Patent No.: US 7,957,702 B2
(45) Date of Patent: Jun. 7, 2011

(54) ADAPTIVE DUPLEX MODES IN TELECOMMUNICATION EQUIPMENT

(76) Inventors: Jacobus Cornelis Haartsen, Hardenberg (NL); William Camp, Chapel Hill, NC (US)

(*) Notice: Subject to any disclaimer, the term of this patent is extended or adjusted under 35 U.S.C. 154(b) by 843 days.

(21) Appl. No.: 11/855,258

(22) Filed: Sep. 14, 2007

(65) Prior Publication Data

US 2008/0153431 A1 Jun. 26, 2008

Related U.S. Application Data

(60) Provisional application No. 60/882,007, filed on Dec. 27, 2006, provisional application No. 60/871,550, filed on Dec. 22, 2006.

(51) Int. Cl.
*H04B 1/44* (2006.01)
*H04M 1/00* (2006.01)
*H04B 1/56* (2006.01)
*H04L 5/14* (2006.01)

(52) U.S. Cl. .......................... 455/78; 455/522; 370/276

(58) Field of Classification Search .................... 455/73, 455/83, 78, 463, 556, 522, 127.1, 298, 562.1, 455/575.7; 370/276, 278, 296
See application file for complete search history.

(56) References Cited

U.S. PATENT DOCUMENTS 6,480,553 B1 * 11/2002 Ho et al. ........................ 375/272

* cited by examiner

*Primary Examiner* — Eugene Yun
(74) *Attorney, Agent, or Firm* — Potomac Patent Group PLLC

(57) ABSTRACT

A transceiver is operated in a cellular communications system, wherein the transceiver has a variable transmitter output power that spans a range of power levels comprising a low-power domain and a high-power domain. Operation includes determining whether the transmitter output power of the transceiver is in the low-power domain or the high-power domain. If the transmitter output power of the transceiver is in the low-power domain, then transceiver operation is initiated in a full-duplex mode in which transmitted and received signals pass through a duplexer associated with a transceiver antenna. If the transmitter output power of the transceiver is in the high-power domain, then transceiver operation is initiated in a half-duplex mode and bypassing the duplexer.

25 Claims, 6 Drawing Sheets

US 7,957,702 B2

ADAPTIVE DUPLEX MODES IN TELECOMMUNICATION EQUIPMENT

CROSS REFERENCE TO RELATED APPLICATIONS

This application claims the benefit of U.S. Provisional Application No. 60/882,007, filed Dec. 27, 2006, and also of U.S. Provisional Application No. 60/871,550, filed Dec. 22, 2006, which applications are hereby incorporated herein by reference in their entireties.

BACKGROUND

The present invention relates to communications equipment, and more particularly to power saving measures in communications equipment.

In the forthcoming evolution of the mobile cellular communication standards like the Global System for Mobile Communication (GSM) and Wideband Code Division Multiple Access (WCDMA), the focus is very much on high capacity and high throughput to individual users in order to support advanced services like video and multimedia applications. A proposal for such a new flexible cellular system is Super 3G or Long-Term 3G Evolution (henceforth, "LTE") (the "3G" standing for "third generation"). This proposed new system can be seen as an evolution of the 3G WCDMA standard. LTE is a packet-switched system in which users share a broadband channel. This allows for flexible resource allocation in which a single user can be provided with very high peak rates.

The main track of the LTE standardization process is considering the use of Frequency Division Duplex (FDD) operation, wherein uplink (UL) and downlink (DL) transmission occur on different frequency bands and transmission and reception occur simultaneously. In order to obtain sufficient isolation between transmission and reception, duplexers are needed at the antenna within the terminal (also called "user equipment"—UE—in WCDMA terminology). These duplexers incur extra power losses. Depending on the carrier spacing between UL and DL and the operating frequencies, the duplexer loss varies between 1.5 and 4 dB.

Power consumption has become a real problem for advanced communication systems. One reason is that battery technology cannot keep up with the pace of the increased amount of power required for high data rate services. Moreover, heat dissipation sets new challenges on mobile phone design.

Any losses in the transceiver (TRX) chain have a direct impact on terminal power consumption. Introducing low power modes with low duty cycles is one way to reduce a terminal's power consumption. For example, for voice users, power savings can be achieved by activating the terminal to send and receive a Voice over Internet Protocol (VoIP) packet only during a short window of time that occurs every 20 ms or so. In between these windows, the terminal can save power by entering a low-power sleep mode.

Losses associated with the duplexer can be eliminated by operating the terminal in a half-duplex mode, in which transmission and reception operations are performed during mutually exclusive periods of time. Since, in such operation, the antenna is never used to simultaneously transmit and receive a signal, there is no need for a duplexer in the circuit. For example, such a technique is used in the GSM system, which is an FDD system but which also has a time offset of 3 time slots between UL and DL transmissions.

A problem arises if one wants to reduce power consumption by using both short windows of activity (separated by intervals of operation in a low-power sleep mode) and half-duplex operation. This is because operating in half-duplex mode, by definition, disallows the transmit and receive windows from occurring simultaneously which, in turn, increases the duty cycle.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses in which a transceiver is operated in a cellular communications system, wherein the transceiver has a variable transmitter output power that spans a range of power levels comprising a low-power domain and a high-power domain. Operation includes determining whether the transmitter output power of the transceiver is in the low-power domain or the high-power domain. If the transmitter output power of the transceiver is in the low-power domain, then transceiver operation is initiated in a full-duplex mode in which transmitted and received signals pass through a duplexer associated with a transceiver antenna. If the transmitter output power of the transceiver is in the high-power domain, then transceiver operation is initiated in a half-duplex mode and bypassing the duplexer.

In some embodiments, initiating transceiver operation in the half-duplex mode comprises communicating a request for half-duplex operation to a base station; and operating the transceiver in the half-duplex mode in response to a confirmation of the request for half-duplex operation from the base station.

In yet another aspect of some embodiments, initiating transceiver operation in the full-duplex mode comprises communicating a request for full-duplex operation to a base station. The transceiver is operated in the full-duplex mode in response to a confirmation of the request for full-duplex operation from the base station.

In still another aspect, a threshold between the low-power domain and the high-power domain is based on an efficiency rating of a power amplifier within the transceiver.

In yet another aspect, a threshold between the low-power domain and the high-power domain is based on an overall power consumption rating of the transceiver.

In still another aspect that is present in some but not necessarily all embodiments, determining whether the transmitter output power of the transceiver is in the low-power domain or the high-power domain comprises comparing a present transmitter output power with a first threshold value when an earlier determination concluded that the transceiver was operating in the low-power domain; and comparing the present transmitter output power with a second threshold value when the earlier determination concluded that the transceiver was operating in the high-power domain. In order to implement hysteresis, the first threshold value is higher than the second threshold value.

BRIEF DESCRIPTION OF THE DRAWINGS

The objects and advantages of the invention will be understood by reading the following detailed description in conjunction with the drawings in which.

DETAILED DESCRIPTION

Figure 1:
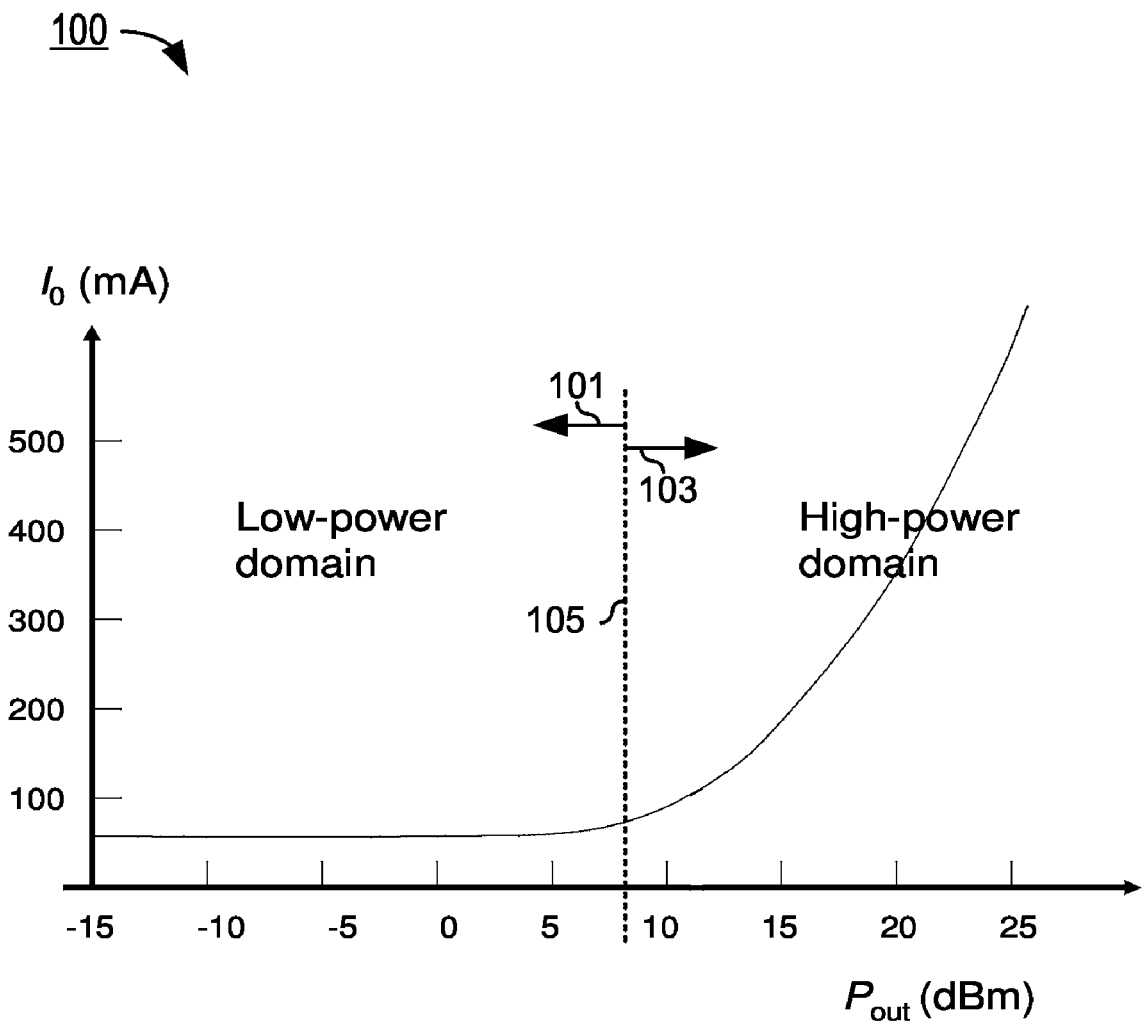
FIG. 1 is an exemplary graph of a terminal's total current consumption plotted as a function of the required output power.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as but not limited to solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In one aspect, the inventors have recognized that, with respect to reducing power consumption, bypassing the duplexer in a transceiver (e.g., by operating in half-duplex mode) is only beneficial if the required transmit power is above a predetermined amount, such as a threshold value lying in the range 5-10 dBm. For lower required transmit power levels, the transmit power is only a minor part of the total power consumption in the terminal. In such cases, entering a half-duplex mode would increase rather than decrease the power consumption.

Accordingly, in an aspect of embodiments consistent with the invention, operation of a terminal involves selectively operating in either a half-duplex mode or a full-duplex mode depending on the amount of transmit power that it is using. If the transmit power is sufficiently low, full-duplex operation is used, which requires that the duplexer be included in the transceiver chain. In some systems, operating in full-duplex mode may require the cooperation of a serving base station (also called "Node B" in WCDMA terminology) to schedule, during full-duplex operation, the uplink and downlink transmission bursts to occur simultaneously in order to minimize the overall duty cycle.

However, if the terminal's transmit power is sufficiently high, then the half-duplex mode is engaged, and the duplexer is switched out of the circuit. In some systems, this may require that the base station schedule UL and DL transmission bursts separated in time. In this half-duplex mode, bypassing the duplexer improves the efficiency of the mobile terminal front-end circuitry.

The strategy outlined above optimizes the power consumption of terminals both close to the base station and farther away. In some embodiments, the terminal requests that it be put in the half-duplex or full-duplex mode depending on its current transmit conditions. The threshold may be vendor specific, as it depends on the efficiency of the power amplifier (PA) and on the overall power consumption in the terminal.

The above and other aspects of the invention are described in greater detail in the following.

The power consumption of a terminal can be attributed to two major sources: 1) the transmission power $P_{TX}$, which consists of the transmitter output power in the UL radio wave radiated by the antenna (herein denoted $P_{out}$) and the power consumed by terminal circuitry to create this wave; and 2) the processing power $P_{proc}$ required in the rest of the terminal (e.g., receiver chain, display, controllers, etc.) to run all the receiver and transmitter circuitry in the analog and digital domain. Thus, the total power consumed by the terminal is $P_{proc} + P_{TX}$.

Due to the limited efficiency of the power amplifier and extra losses like the duplexer loss, the transmission power $P_{TX}$ is normally much larger than the terminal output power $P_{out}$ (i.e., the power of the transmitted radio wave) and the efficiency of the transmitter chain is defined as $P_{out}/P_{TX}$. Power amplifier efficiency is normally optimized for the higher output power levels like 20-24 dBm. At lower output power levels, the efficiency degrades. FIG. 1 is an exemplary graph 100 of a terminal's total current consumption plotted as a function of the required output power. Clearly, a low-power domain 101 and high-power domain 103 can be observed on either side of a threshold 105. In this example, the threshold 105 is defined by the output power $P_{out}$. However, in alternative embodiments the threshold 105 could equivalently be defined in terms of transmission power, $P_{TX}$, since the two are closely related (i.e., via the efficiency value, which is implementation dependent).

In the low-power domain 101, the processing power dominates (i.e., most of the expended energy is attributed to processing within the terminal). Within the low-power domain 101, an increase in the output power will have little effect on the total terminal power consumption.

By contrast, in the high-power domain 103, the mobile transmitter power consumption is the dominant contributor to the terminal's total current consumption. Because any increase in transmitter output power $P_{out}$ is directly reflected in the overall terminal power consumption, anything that can be done to increase the mobile terminal transmit efficiency in the high power domain will have a very large impact on power consumption. In this example, the threshold 105 between the low- and high-power domains 101, 103 lies around 5-10 dBm and is implementation dependent.

Introducing low duty cycle modes in a communication system has a direct and beneficial impact on the terminal current consumption. When the terminal can enter a low-power suspend or sleep mode, the average power consumption is reduced considerably. To minimize the terminal activity, all activity should be concentrated within a small time window. Since FDD allows transmit bursts and receive bursts to occur simultaneously, it facilitates the bundling of activity within a small time window and can therefore be beneficial in reducing the power consumption in low power modes. However, this is only true in the low-power domain 101. In the high-power domain 103, loss in the duplexer, the use of which is mandatory for full-duplex FDD operation, has a major impact on power consumption.

In view of the above, in accordance with an aspect of embodiments consistent with the invention, when the output power $P_{out}$ (preferably based on instantaneous values) of the terminal lies in low-power domain operation, the terminal should minimize its activity windows (and thereby maximize the sleep time of the terminal) by applying full-duplex FDD. To facilitate this operation, the base station should schedule uplink and downlink transmissions to occur simultaneously. However, when the instantaneous output power of the terminal lies in high-power domain operation, the terminal should apply half-duplex FDD and take steps to bypass the duplexer. The base station in these instances should cooperate with the terminal by staggering the uplink and downlink transmissions so that they never coincide with one another.

Figure 2A:
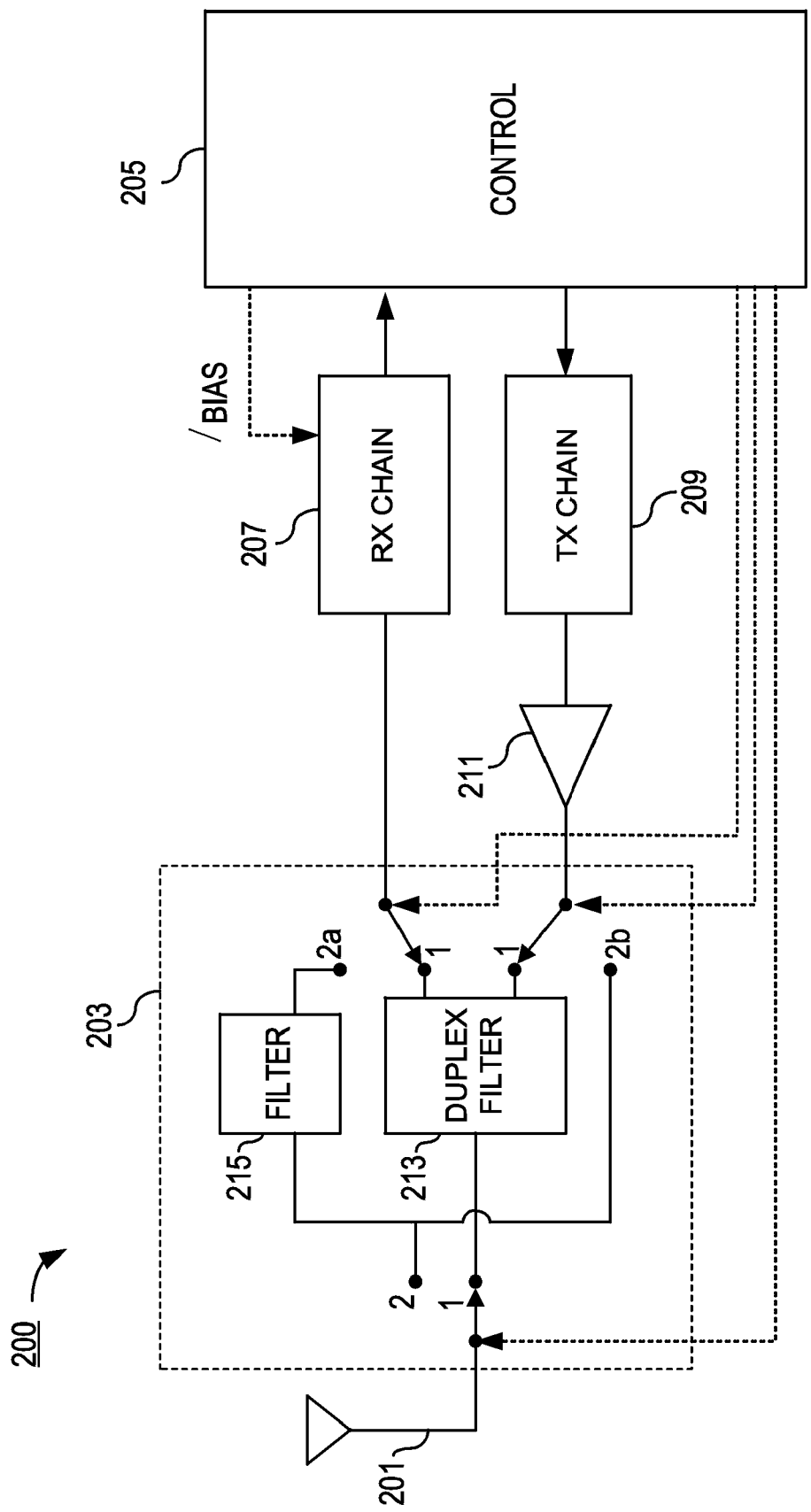
FIGS. 2a, 2b, and 2c are block diagrams of an exemplary terminal arrangement 200 employing aspects of the invention.
Figure 2B:
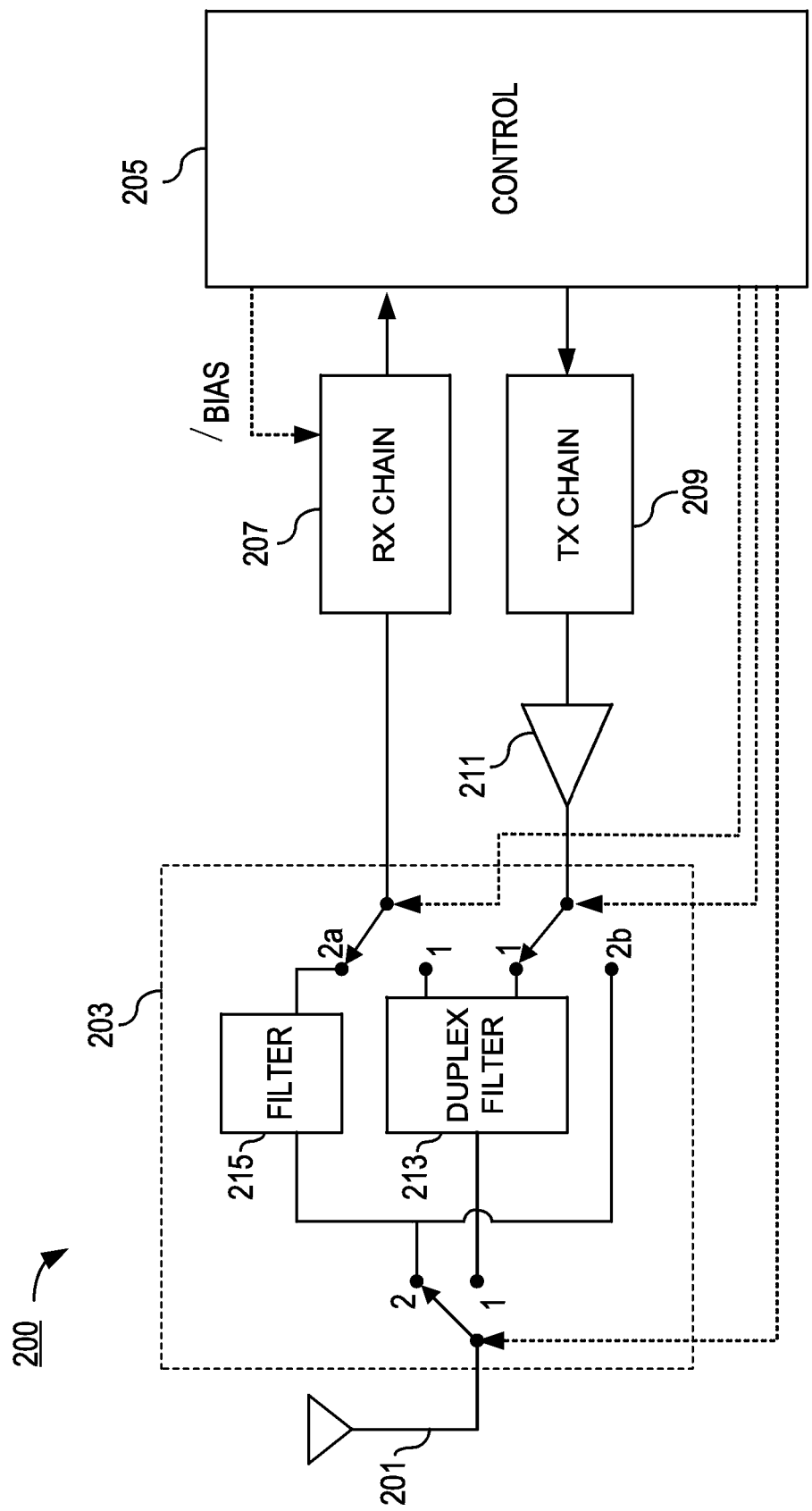
Figure 2C:
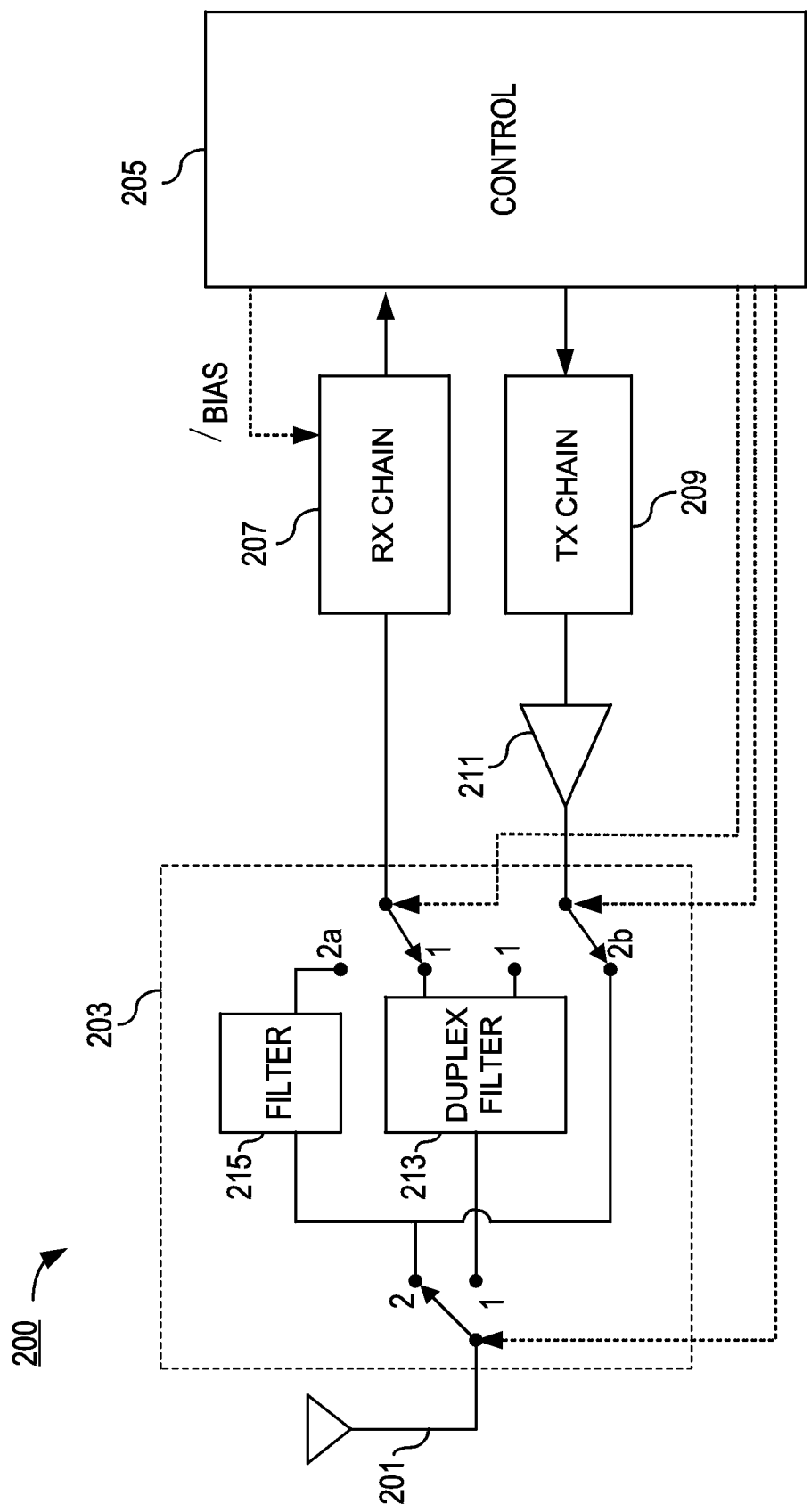

FIGS. 2a, 2b, and 2c are block diagrams of an exemplary terminal arrangement 200 employing aspects of the invention. At the antenna 201, a switching circuit 203 is present that enables selection between full- and half-duplex operation. A controller 205 is provided for determining how the terminal 200 should be operating and for generating the necessary control signals that are distributed to other components to make that happen. For full-duplex operation, depicted in FIG. 2a, the controller 205 causes switches within the switching circuit 203 to be connected to the "1"-nodes. As mentioned above, this mode should be selected when the terminal is operating in the low-power domain 101. In the full-duplex mode of operation, reception through the receiver chain 207 and transmission through the transmitter chain 209 and power amplifier 211 can occur simultaneously. This is possible because the controller 205 causes a duplexer 213 (e.g., a duplex filter with separate pass bands for the TX and RX bands) to be switched into the transmit/receive path during this mode of operation.

For half-duplex operation, the switch positions depend on whether a receive or a transmit operation will be performed. In theory, a switching arrangement could be devised in which the receiver chain 207 and transmitter chain 209 are simultaneously connected to the antenna 201 because it is known that the receiver chain 207 and transmitter chain 209 will never be operated simultaneously.

However, in practical embodiments it is preferred that the receiver chain 207 and transmitter chain 209 not be simultaneously connected to the antenna 201 because such a connection would cause impedance at the connection junction to drop to an undesirable level (e.g., 25 ohms instead of 50 ohms) which in turn would cause an undesirable loss in power.

Therefore, in this exemplary embodiment, switches are independently controlled to enable the following operation. FIG. 2b illustrates the switch positions for half-duplex operation when a receiver operation is to be performed. As can be seen, the controller 205 causes the antenna 201 to be connected to the "2"-node of the switching circuit 203, and the receiver chain 207 to be connected to the "2a"-node of the switching circuit 203. The power amplifier 211 is disconnected from this circuit by having the switch at its output port connected to the "1"-node of the switching circuit 203. This switch configuration introduces a pass filter 215 for the RX band between the antenna 201 and the RX chain 207.

FIG. 2c illustrates the switch positions for half-duplex operation when a transmit operation is performed. As shown, the controller 205 causes the antenna 201 to be connected to the "2"-node of the switching circuit 203, and the output of the power amplifier 211 to be connected to the "2b"-node of the switching circuit 203. The receiver chain 207 is disconnected from this circuit by having the switch at its input port connected to the "1"-node of the switching circuit 203. This switch configuration permits the output from the power amplifier 211 to be coupled directly to the antenna 201.

With the switching arrangement illustrated in FIGS. 2a, 2b, and 2c, a design consideration is that the distances between switching port "2" and the filter 215, and between switching port "2" and switching port "2b" should be small relative to a wavelength of the signal being passed, in order to reduce adverse reflections that would also increase the Voltage Standing Wave Ratio (VSWR) at switching port "2".

Figure 2D:
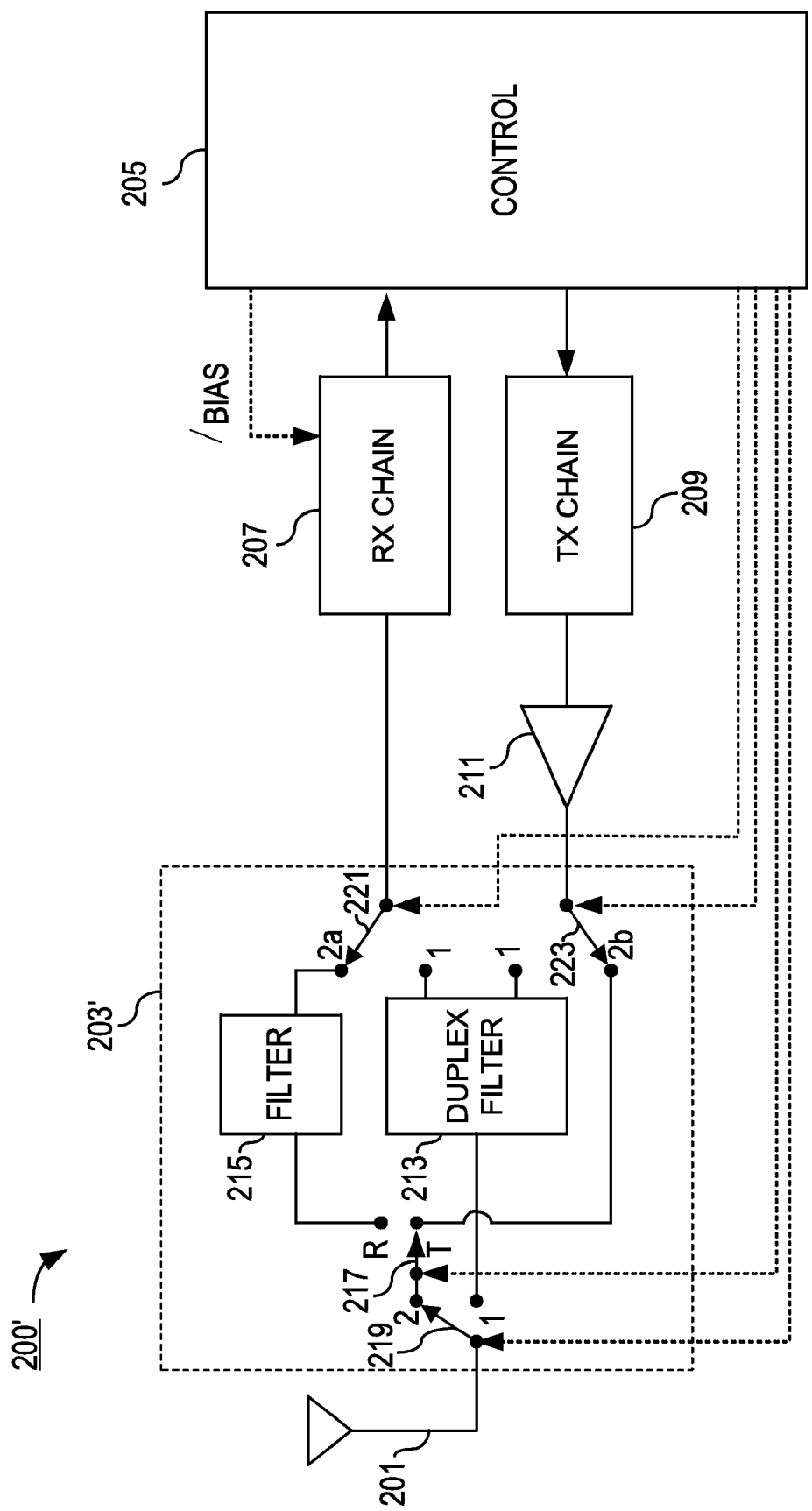
FIG. 2d is a block diagram of an alternative embodiment of an exemplary terminal arrangement 200' employing aspects of the invention.

Use of the particular switching arrangement illustrated in FIGS. 2a, 2b, and 2c is not essential to the invention. Other arrangements can also be used. For example, FIG. 2d illustrates an alternative exemplary terminal arrangement 200' that is characterized by a switching arrangement 203'. The switching arrangement 203' accomplishes the same goals as the earlier-described switching arrangement 203; that is, for full-duplex operation the duplexer 213 is introduced between the antenna 201 on one side and the receiver chain 207 and transmitter chain 209 on the other, and for half-duplex operation the duplexer 213 is switched out of the circuit. The switching arrangement 203' includes an extra switch 217 that is not present in the earlier-described embodiment.

In full-duplex operation, the switches 219, 221, and 223 are all set to the "1"-nodes of the switching arrangement 203'. This introduces the duplexer 213 between the antenna 201 on one side and the receiver chain 207 and transmitter chain 209 on the other. The position of switch 217 for this operation is irrelevant.

For half-duplex operation, the switch 219 is connected to the "2"-node of the switching arrangement 203'; the switch 221 is connected to the "2a"-node of the switching arrangement 203'; and the switch 223 is connected to the "2b"-node of the switching arrangement 203'. Further, for receive operations the switch 219 is connected to the "R"-node, whereas for transmit operations the switch 219 is connected to the "T"-node.

In either case (i.e., receiver operation or transmit operation) and regardless of which embodiment one considers, when configured for half-duplex operation, the duplexer 213 is switched out of the circuit, which eliminates this component as a source of power consumption. As explained earlier, operation in half-duplex mode should be used when the terminal is operating in the high-power domain. The controller 205 preferably uses internal settings upon which it bases a decision whether it will operate in the full- or half-duplex mode. The terminal should indicate its preferred operating mode to the base station. For example, the terminal's preference can be communicated to the base station over a dedicated control channel. Depending on the traffic conditions (e.g., the load, the number of users to be served, the Quality of Service—"QoS"—required), the base station may confirm or deny acceptance of the terminal's request via, for example, a downlink control channel. In the full-duplex mode, the base station will schedule UL and DL transmissions simultaneously. The terminal (e.g., under the direction of the controller 205) will use the duplexer 213 and maximize its sleep time in between the UL/DL transactions. In half-duplex mode, the base station will stagger the UL and DL transmissions in time. Accordingly, the controller 205 will cause the terminal to bypass the duplexer 213 in order to increase its sensitivity in the RX chain and to improve the efficiency in the TX chain.

In another aspect of some embodiments consistent with the invention, an arrangement such as either of those depicted in FIGS. 2a, 2b, 2c, and 2d (i.e., in which the duplexer can be selectively bypassed and the terminal operated in either half- or full-duplex mode) makes it possible for further efficiencies to be achieved. For example, any action in the terminal that requires reception without transmission, like listening to the Broadcast Channel (BCH), Synchronization Channel (SCH), or performing Handover (HO) measurements, can also cause the duplexer 213 to be bypassed (as long as no other transmissions are required at the same time). The duplexer 213 can also be bypassed for an action that requires transmission without reception, such as the random access burst transmission (so long as no other signal needs to be simultaneously received). Either or both of these bypass actions can be applied irrespective of whether the terminal is operating in the low-power or high-power domain. The terminal can thus improve link budget for these kinds of control signalling. However, in receiving mode, the sensitivity of the receiver can also be traded for current consumption. When the received signal is less attenuated, the noise figure of the receiver can be raised while maintaining the same sensitivity level. Since the noise figure is proportional to the current, the current can be reduced.

Figure 3:
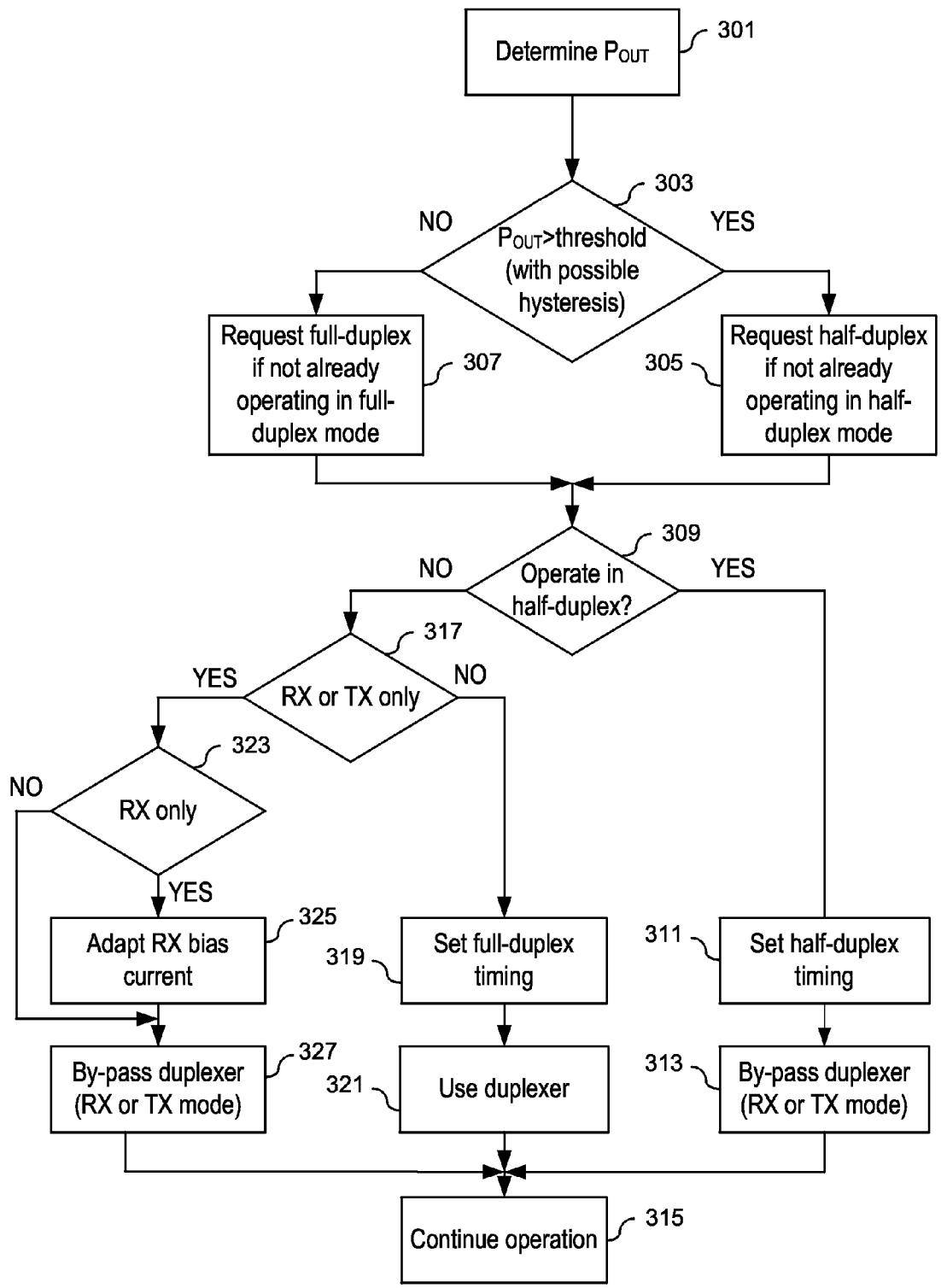
FIG. 3 is a flow diagram of exemplary actions performed in a terminal.

FIG. 3 is a flow diagram of exemplary actions performed in the terminal under the direction of, for example, the controller 205. Initially, the output power level, $P_{out}$ is determined (step 301). To determine whether the terminal is operating in the low-power domain or the high-power domain, the transmit power level, $P_{out}$, is compared with a threshold value (e.g., the threshold 105) (decision block 303). If the output power level, $P_{out}$, is greater than the threshold value, ("YES" path out of decision block 303), the terminal is operating in the high-power domain. Consequently, the terminal sends the base station a request to operate in half-duplex mode (step 305). For the sake of efficiency, it is preferred that such a request be sent only if the terminal is not already operating in half-duplex mode.

However, if it was determined that the output power level, $P_{out}$, is not greater than the threshold value, ("NO" path out of decision block 303), the terminal is operating in the low-power domain. Consequently, the terminal sends the base station a request to operate in full-duplex mode (step 307). Again for the sake of efficiency, it is preferred that such a request be sent only if the terminal is not already operating in full-duplex mode.

In some embodiments, the threshold value (e.g., the threshold 105) is dynamically adapted to implement a hysteresis, based upon whether present operation is in the low-power domain 101 or the high-power domain 103 (i.e., a higher threshold value is used when the terminal is operating in the low-power domain 101, and a lower threshold value is used when the terminal is operating in the high-power domain 103). The hysteresis can advantageously prevent operation of the terminal from flip-flopping back and forth between full-duplex mode and half-duplex mode when the terminal is operating in a border area of the output power level threshold.

Following performance of either of steps 305 and 307, the terminal detects the base station's response and acts accordingly (decision block 309). If the terminal's request for half-duplex operation was confirmed or if the terminal's request for full-duplex operation was denied ("YES" path out of decision block 309), the terminal sets the half-duplex timing (step 311) for half-duplex operation. In this mode, the terminal will alternatively transmit and receive at different times. In order to save power, the duplexer is bypassed in this mode (step 313). As described earlier, this step preferably involves switching in only one of the receiver chain and transmitter chain based on whether a receiver operation or a transmitter operation is planned. The terminal then continues with other operations (step 315) which are known in the art and are beyond the scope of the invention.

Returning to decision block 309, if the terminal's request for half-duplex operation was denied or if the terminal's request for full-duplex operation was confirmed ("NO" path out of decision block 309) another test is performed to determine whether the planned operation will involve reception without transmission or transmission without reception (decision block 317). If neither of these is the case ("NO" path out of decision block 317), the terminal will operate in full-duplex mode. Accordingly, the terminal sets the full-duplex timing (step 319) for full-duplex operation. In this mode, the terminal will be able to simultaneously transmit and receive. In order to enable this operation, the duplexer is engaged in the send/receive path (step 321). The terminal then continues with other operations (step 315) which, as described above, are known in the art and are beyond the scope of the invention.

Returning to a consideration of decision block 317, if the planned operation will involve reception without transmission or transmission without reception ("YES" path out of decision block 317), the terminal will not need to use its duplexer. In this exemplary embodiment, further efficiencies are obtained by performing another test to determine whether the planned operation will involve reception without transmission (decision block 323).

If the planned operation will involve reception without transmission ("YES" path out of decision block 323), the terminal adapts its receiver bias current (step 325) and causes the duplexer to be bypassed (step 327). The terminal then continues with other operations (step 315) which, as described above, are known in the art and are beyond the scope of the invention.

However, if the planned operation will involve transmission without reception ("NO" path out of decision block 323), then the terminal skips the receiver bias adaptation step and instead performs the duplexer bypass operation (step 327). In some alternative embodiments, the terminal achieves further efficiencies by switching off the RX chain completely when the planned operation will involve transmission without reception.

For reasons set forth earlier, step 327 preferably involves switching in only one of the receiver chain and transmitter chain based on whether a receiver operation or a transmitter operation is planned.

It will be recognized that the actions represented by blocks 317, 323, 325, and 327 can be used to achieve power savings even if other aspects of the invention (e.g., bypassing the duplexer based on whether the terminal is operating in the low- or high-power domain) are not being used. The opposite is true as well: Power savings associated with bypassing the duplexer based on whether the terminal is operating in the low- or high-power domain can be obtained even if the actions represented by blocks 317, 323, 325, and 327 are not being used.

The various aspects of embodiments consistent with the invention optimize the terminal power consumption, taking into account the amount of power used for transmission and the overall power used to operate the terminal.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a transceiver in a cellular communications system, wherein the transceiver has a variable transmitter output power that spans a range of power levels comprising a low-power domain and a high-power domain, the method comprising:
   determining whether the transmitter output power of the transceiver is in the low-power domain or the high-power domain;
   if the transmitter output power of the transceiver is in the low-power domain, then initiating transceiver operation in a full-duplex mode in which transmitted and received signals pass through a duplexer associated with a transceiver antenna, wherein the duplexer obtains a level of isolation between transmitted and received signals; and
   if the transmitter output power of the transceiver is in the high-power domain, then initiating transceiver operation in a half-duplex mode and bypassing the duplexer.

2. The method of claim 1, wherein initiating transceiver operation in the half-duplex mode comprises:
   communicating a request for half-duplex operation to a base station; and
   operating the transceiver in the half-duplex mode in response to a confirmation of the request for half-duplex operation from the base station.

3. The method of claim 2, comprising:
   in response to a denial of the request for half-duplex operation from the base station, performing:
      determining whether a planned transceiver operation involves transmitting without receiving; and
      if the planned transceiver operation involves transmitting without receiving, then bypassing the duplexer as part of the planned transceiver operation.

4. The method of claim 2, comprising:
   in response to a denial of the request for half-duplex operation from the base station, performing:
      determining whether a planned transceiver operation involves receiving without transmitting; and
      if the planned transceiver operation involves receiving without transmitting, then bypassing the duplexer as part of the planned transceiver operation.

5. The method of claim 4, comprising:
   if the planned transceiver operation involves receiving without transmitting, then reducing bias current in receiver circuitry while maintaining required sensitivity.

6. The method of claim 4, wherein the planned transceiver operation comprises at least one operation selected from: reading a broadcast control channel; reading a paging control channel; scanning for synchronization channels; and a cell search operation.

7. The method of claim 1, wherein initiating transceiver operation in the full-duplex mode comprises:
   communicating a request for full-duplex operation to a base station; and
   operating the transceiver in the full-duplex mode in response to a confirmation of the request for full-duplex operation from the base station.

8. The method of claim 7, comprising:
   in response to a denial of the request for full-duplex operation from the base station, performing:
      determining whether a planned transceiver operation involves transmitting without receiving; and
      if the planned transceiver operation involves transmitting without receiving, then bypassing the duplexer as part of the planned transceiver operation.

9. The method of claim 7, comprising:
   in response to a denial of the request for full-duplex operation from the base station, performing:
      determining whether a planned transceiver operation involves receiving without transmitting; and
      if the planned transceiver operation involves receiving without transmitting, then bypassing the duplexer as part of the planned transceiver operation.

10. The method of claim 9, comprising:
    if the planned transceiver operation involves receiving without transmitting, then reducing bias current in receiver circuitry while maintaining required sensitivity.

11. The method of claim 1, wherein a threshold between the low-power domain and the high-power domain is based on an efficiency rating of a power amplifier within the transceiver.

12. The method of claim 1, wherein a threshold between the low-power domain and the high-power domain is based on an overall power consumption rating of the transceiver.

13. The method of claim 1, wherein determining whether the transmitter output power of the transceiver is in the low-power domain or the high-power domain comprises:
    comparing a present transmitter output power with a first threshold value when an earlier determination concluded that the transceiver was operating in the low-power domain; and
    comparing the present transmitter output power with a second threshold value when the earlier determination concluded that the transceiver was operating in the high-power domain,
    wherein the first threshold value is higher than the second threshold value.

14. An apparatus that operates a transceiver in a cellular communications system, wherein the transceiver has a variable transmitter output power that spans a range of power levels comprising a low-power domain and a high-power domain, the method comprising:
    logic configured to determine whether the transmitter output power of the transceiver is in the low-power domain or the high-power domain;
    logic configured to respond to a determination that the transmitter output power of the transceiver is in the low-power domain by initiating transceiver operation in a full-duplex mode in which transmitted and received signals pass through a duplexer associated with a transceiver antenna, wherein the duplexer obtains a level of isolation between transmitted and received signals; and
    logic configured to respond to a determination that the transmitter output power of the transceiver is in the high-power domain by initiating transceiver operation in a half-duplex mode and bypassing the duplexer.

15. The apparatus of claim 14, wherein the logic configured to respond to the determination that the transceiver is in the high-power domain by initiating transceiver operation in the half-duplex mode comprises:
    logic configured to communicate a request for half-duplex operation to a base station; and
    logic configured to operate the transceiver in the half-duplex mode in response to a confirmation of the request for half-duplex operation from the base station.

16. The apparatus of claim 15, comprising:
    logic configured to respond to a denial of the request for half-duplex operation from the base station by performing:
       determining whether a planned transceiver operation involves transmitting without receiving; and if the planned transceiver operation involves transmitting without receiving, then bypassing the duplexer as part of the planned transceiver operation.

17. The apparatus of claim 15, comprising:
logic configured to respond to a denial of the request for half-duplex operation from the base station by performing:
determining whether a planned transceiver operation involves receiving without transmitting; and
if the planned transceiver operation involves receiving without transmitting, then bypassing the duplexer as part of the planned transceiver operation.

18. The apparatus of claim 17, comprising:
if the planned transceiver operation involves receiving without transmitting, then reducing bias current in receiver circuitry while maintaining required sensitivity.

19. The apparatus of claim 14, wherein the logic configured to respond to the determination that the transceiver is in the low-power domain by initiating transceiver operation in the full-duplex mode comprises:
logic configured to communicate a request for full-duplex operation to a base station; and
logic configured to operate the transceiver in the full-duplex mode in response to a confirmation of the request for full-duplex operation from the base station.

20. The apparatus of claim 19, comprising:
logic configured to respond to a denial of the request for full-duplex operation from the base station by performing:
determining whether a planned transceiver operation involves transmitting without receiving; and
if the planned transceiver operation involves transmitting without receiving, then bypassing the duplexer as part of the planned transceiver operation.

21. The apparatus of claim 19, comprising:
logic configured to respond to a denial of the request for full-duplex operation from the base station by performing:
determining whether a planned transceiver operation involves receiving without transmitting; and
if the planned transceiver operation involves receiving without transmitting, then bypassing the duplexer as part of the planned transceiver operation.

22. The apparatus of claim 21, comprising:
if the planned transceiver operation involves receiving without transmitting, then reducing bias current in receiver circuitry while maintaining required sensitivity.

23. The apparatus of claim 14, wherein a threshold between the low-power domain and the high-power domain is based on an efficiency rating of a power amplifier within the transceiver.

24. The apparatus of claim 14, wherein a threshold between the low-power domain and the high-power domain is based on an overall power consumption rating of the transceiver.

25. The apparatus of claim 14, wherein the logic configured to determine whether the transmitter output power of the transceiver is in the low-power domain or the high-power domain comprises:
logic configured to compare a present transmitter output power with a first threshold value when an earlier determination concluded that the transceiver was operating in the low-power domain; and
logic configured to compare the present transmitter output power with a second threshold value when the earlier determination concluded that the transceiver was operating in the high-power domain,
wherein the first threshold value is higher than the second threshold value.

* * * * *